(12) United States Patent
Fiedel et al.

(10) Patent No.: US 10,787,464 B2
(45) Date of Patent: Sep. 29, 2020

(54) ZINC KETOIMINATE COMPLEXES AS CATALYSTS FOR THE PRODUCTION OF POLYURETHANES

(71) Applicant: Evonik Operations GmbH, Essen (DE)

(72) Inventors: Michael Fiedel, Essen (DE); Thomas Günther, Neuss (DE); Martin Glos, Borken (DE); Michael Ferenz, Essen (DE); Christian Eilbracht, Herne (DE); Wilfried Knott, Essen (DE); Stephan Schulz, Essen (DE); Dennis Dittrich, Recklinghausen (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 16/648,345

(22) PCT Filed: Sep. 14, 2018

(86) PCT No.: PCT/EP2018/074870
§ 371 (c)(1),
(2) Date: Mar. 18, 2020

(87) PCT Pub. No.: WO2019/076552
PCT Pub. Date: Apr. 25, 2019

(65) Prior Publication Data
US 2020/0216474 A1   Jul. 9, 2020

(30) Foreign Application Priority Data

Oct. 17, 2017   (DE) .......................... 10 2017 218 509

(51) Int. Cl.
*C07F 3/06* (2006.01)
*C08G 18/22* (2006.01)

(52) U.S. Cl.
CPC .............. *C07F 3/06* (2013.01); *C08G 18/222* (2013.01)

(58) Field of Classification Search
CPC ................................ C08G 18/222; C07F 3/06
See application file for complete search history.

(56) References Cited

U.S. PATENT DOCUMENTS

| | | | |
|---|---|---|---|
| 3,775,452 A | 11/1973 | Karstedt | |
| 3,929,794 A * | 12/1975 | McCrae | C09B 43/00 546/7 |
| 4,417,068 A | 11/1983 | Kollmeier et al. | |
| 6,307,082 B1 | 10/2001 | Klein et al. | |
| 7,947,814 B2 * | 5/2011 | Lei | C07F 9/005 534/15 |
| 9,695,202 B2 | 7/2017 | Henning et al. | |
| 9,896,534 B2 | 2/2018 | Lobert et al. | |
| 9,896,541 B2 | 2/2018 | Fiedel et al. | |
| 9,975,909 B2 | 5/2018 | Schubert et al. | |
| 10,023,679 B2 | 7/2018 | Klostermann et al. | |
| 10,087,278 B2 | 10/2018 | Fiedel et al. | |
| 10,099,211 B2 | 10/2018 | Knott et al. | |
| 10,106,649 B2 | 10/2018 | Fiedel et al. | |
| 10,160,832 B2 | 12/2018 | Lobert et al. | |
| 10,189,965 B2 | 1/2019 | Krebs et al. | |
| 10,287,454 B2 | 5/2019 | Klotzbach et al. | |
| 10,299,471 B2 | 5/2019 | Hansel et al. | |
| 10,351,687 B2 | 7/2019 | Diendorf et al. | |
| 10,399,998 B2 | 9/2019 | Knott et al. | |
| 10,407,546 B2 | 9/2019 | Lobert et al. | |
| 10,407,592 B2 | 9/2019 | Amajjahe et al. | |
| 10,414,871 B2 | 9/2019 | Knott et al. | |
| 10,414,872 B2 | 9/2019 | Knott et al. | |
| 10,457,769 B2 | 10/2019 | Gunther et al. | |
| 10,519,280 B2 | 12/2019 | Knott et al. | |
| 10,526,454 B2 | 1/2020 | Knott et al. | |
| 10,544,267 B2 | 1/2020 | Knott et al. | |
| 10,544,384 B2 | 1/2020 | Scheuermann et al. | |
| 2016/0096939 A1 | 4/2016 | Glos et al. | |
| 2016/0130402 A1 | 5/2016 | Schubert et al. | |
| 2016/0152739 A1 | 6/2016 | Eilbracht et al. | |
| 2016/0319094 A1 | 11/2016 | Diendorf et al. | |
| 2017/0081464 A1 | 3/2017 | Fiedel et al. | |
| 2017/0174817 A1 | 6/2017 | Gunther et al. | |
| 2017/0198099 A1 | 7/2017 | Knott | |
| 2017/0226264 A1 | 8/2017 | Gunther et al. | |
| 2018/0016392 A1 | 1/2018 | Lobert et al. | |
| 2018/0016406 A1 | 1/2018 | Luthge et al. | |
| 2018/0044463 A1 | 2/2018 | Gunther et al. | |
| 2018/0162982 A1 | 6/2018 | Glos | |
| 2018/0194889 A1 | 7/2018 | Gunther et al. | |
| 2018/0258228 A1 | 10/2018 | Amajjahe et al. | |
| 2018/0327563 A1 | 11/2018 | Klostermann et al. | |
| 2019/0100625 A1 | 4/2019 | Knott et al. | |
| 2019/0106369 A1 | 4/2019 | Schubert et al. | |
| 2019/0106441 A1 | 4/2019 | Knott et al. | |
| 2019/0112502 A1 | 4/2019 | Sloot et al. | |
| 2019/0233571 A1 | 8/2019 | Diendorf et al. | |
| 2019/0300728 A1 | 10/2019 | Klostermann et al. | |
| 2020/0055991 A1 | 2/2020 | Knott et al. | |
| 2020/0055992 A1 | 2/2020 | Knott et al. | |

FOREIGN PATENT DOCUMENTS

| | | | |
|---|---|---|---|
| EP | 0075703 A1 | 4/1983 | |
| EP | 1031603 A2 | 8/2000 | |
| WO | 2012/006264 A1 | 1/2012 | |
| WO | WO-2012006264 A1 * | 1/2012 | ......... C08G 18/3206 |

OTHER PUBLICATIONS

C. Scheiper et al., European Journal of Inorganic Chemistry, 2230-2240 (2014) (Year: 2014).*
S. Schultz et al., 638 Zeitschrift fuer Anorganische und Allgemeine Chemie, 2102-2105 (2012) (Year: 2012).*
W. Chuang et al., RSC Advances (2016) (Year: 2016).*
U. Doraswamy et al., 37 Journal of Inorganic and Nuclear Chemistry, 1665-1668 (1975) (Year: 1975).*

(Continued)

*Primary Examiner* — Alexander R Pagano
(74) *Attorney, Agent, or Firm* — Nexsen Pruet PLLC; Philip P. McCann

(57) ABSTRACT

The use of zinc ketoiminate complexes in the production of polyurethanes is described, wherein the zinc ketoiminate complexes are obtainable by reacting a zinc compound with certain ketimines.

20 Claims, No Drawings

(56) References Cited

OTHER PUBLICATIONS

M. Fuchs et al., 4 Catalyst Science & Technology (2014) (Year: 2014).*
D. Pugh et al., 51 Inorganic Chemistry, 6385-6395 (2012) (Year: 2012).*
M. Aslam et al., 34 Journal of the Chemical Society of Pakistan, 391-395 (2012) (Year: 2012).*
D. Wilson et al., European Journal of Inorganic Chemistry, 1130-1138 (2012) (Year: 2012).*
German language International Search Report dated Jan. 15, 2019 in PCT/EP2018/074870 (4 pages).
German language Written Opinion dated Jan. 15, 2019 in PCT/EP2018/074870 (2 pages).
GLOS, U.S. Appl. No. 16/636,697, filed Feb. 5, 2020.
International Search Report dated Jan. 15, 2019 in PCT/EP2018/074870 (4 pages).
Klostermann et al., U.S. Appl. No. 16/632,922, filed Jan. 22, 2020.
Lesikar L A et al., "Synthesis, characterization, and steric hindrance comparisons of selected transition and main group metal beta-ketoiminato complexes," Journal of Organometallic Chemistry, Elsevier-Sequoia S.A. Lausanne, CH, vol. 693, No. 20, Oct. 2008 (Oct. 2008), pp. 3245-3255 (11 pages).
Xuan Pang et al., "Crown-like macrocycle zinc complex derived from [beta]-diketone ligand for the polymerization of rac-lactide," Journal of Polymer Science, Part A: Polymer Chemistry, US, vol. 46, No. 2, Jan. 15, 2008 (Jan. 15, 2008), pp. 643-649 (7 pages).

* cited by examiner

ZINC KETOIMINATE COMPLEXES AS CATALYSTS FOR THE PRODUCTION OF POLYURETHANES

CROSS REFERENCE TO RELATED APPLICATIONS

This application is a 35 U.S.C. § 371 U.S. national phase entry of International Application No. PCT/EP2018/074870 having an international filing date of Sep. 14, 2018, which claims the benefit of German Application No. 10 2017 218 509.0 filed Oct. 17, 2017, each of which is incorporated herein by reference in its entirety.

FIELD

The present invention relates to the use of zinc complexes for producing polyurethanes, to compositions comprising these zinc complexes and also to polyurethane systems which have been obtained using these zinc complexes.

In the field of organometallic catalysts for polyurethane-based systems, organotin compounds have become established over the years as the most widely used systems. These are organometallic compounds comprising one or more tin-carbon bonds and can be described by the general formula $R_mSnX_n$. In this case, R is a hydrocarbon radical and X is another group such as, for example, carboxylic acids, alcohols, glycols, thiols, thioglycols or mercaptocarboxylic acids. Owing to its high compatibility, solubility, sufficient stability and above all remarkable catalytic activity, a catalyst particularly frequently used is dibutyltin dilaurate (DBTL). It finds broad use not only in the field of PU foam production, but also in the so-called CASE (Coating, Adhesives, Sealants and Elastomers) field. However, since the end of the 90s, the use of organotin compounds such as DBTL has been ever further limited or even banned by legislation in many countries owing to its toxicological properties.

BACKGROUND

There is accordingly a continuous demand to the present day to provide toxicologically safe alternatives to replace the organotin catalysts in question.

SUMMARY

Surprisingly, it was possible to find in the context of this invention that certain zinc ketoiminate complexes, which are described more precisely below, are outstandingly suitable as catalysts in the production of polyurethanes and can serve as toxicologically safer alternatives to the organotin catalysts.

DETAILED DESCRIPTION

The subject matter of the invention arises therefrom, namely the use of zinc ketoiminate complexes in the production of polyurethanes, wherein the zinc ketoiminate complexes are obtainable by reacting a zinc compound (A) with ketimines (B) of the formula (I) and optionally alcohol or polyether, wherein the ketimine of the formula (I) is as defined below

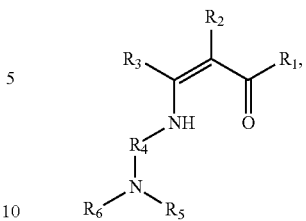

(I)

where $R^1$ and $R^3$ are identical or different organic radicals having 1 to 6 carbon atoms, which optionally may comprise heteroatoms such as oxygen, nitrogen and/or halogen atoms, preferably $CH_3$—, $C_2H_5$— or $C_3H_7$—, especially $CH_3$—

$R^2$ is H—, $R^4$ is an organic radical having 1 to 4 carbon atoms, which optionally may comprise heteroatoms such as oxygen, nitrogen and/or halogen atoms, preferably $C_2H_4$— or $C_3H_6$—, especially $C_2H_4$—, $R^5$ and $R^6$ are identical or different organic radicals having 1 to 6 carbon atoms, which optionally may comprise heteroatoms such as oxygen, nitrogen and/or halogen atoms, preferably $CH_3$—, $C_2H_5$— or $C_3H_7$—, especially $CH_3$—, wherein the radicals $R^5$ and $R^6$ may also be bonded to form a ring, preferably a five-membered ring. Customary alcohols, and also polyoxyalkylenes or polyoxyalkylated compounds having at least one OH function, can serve as alcohols. These are described more precisely hereinafter. Polyethers are compounds, repeating units of which comprise ether functionalities (C—O—C).

The zinc ketoiminate complexes according to the invention comprise a ligand of the formula (I), particularly in deprotonated form.

In the reaction according to the invention, both ketimine (B) and alcohol or polyether may be used in deprotonated form. This corresponds to a preferred embodiment of the invention.

The zinc ketoiminate complexes according to the invention may be referred to either as zinc ß-ketoiminates or zinc ß-ketoiminate complexes.

The ketimines (B) may also be referred to as ß-ketoimine ligands. The ß-ketoimine ligands are very generally known monoanionic N,O-chelate ligands, the basic structure of which is as follows:

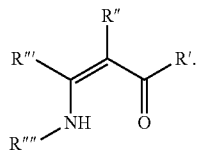

They are widely used and find wide-ranging application in catalysis, chemical gas phase deposition and atomic layer deposition. The synthesis thereof generally proceeds via a condensation reaction between acetylacetone and an amine. Whereas the radicals R' to R''' influence the electronic properties of the ligand, the radical R'''' on the nitrogen influences the steric requirement. Metal complexes based on ß-ketoimine ligands, which comprise a semi-labile sidearm donor, are also frequently described in the scientific literature (Lesikar et al., J. of Org. Chemistry 2008, 693, 3245, Schulz et al., Z. Anorg. Allg. Chem. 2012, 638 (12-13), 2102) and are mainly used as catalysts for ring-opening polymerization of lactide or copolymerization of $CO_2$ and epoxides (Tang et al., Macromolecules 2007,40, 8855, Olejnik et al. J. of Org. Chemistry 2015, 794, 237).

In the context of the present invention, it has now been found that, surprisingly, zinc ß-ketoiminates, which comprise a ligand of the formula (I) in deprotonated form, readily catalyse the reaction of isocyanates with alcohols to give urethanes.

The catalytic activity can be investigated in particular by monitoring the NCO band by in situ IR spectroscopy. In the context of the present invention, for example, the reaction of isopropanol with phenyl isocyanate in the presence of 1 mol % of a zinc ß-ketoiminate complex according to the invention as catalyst was investigated. It was found that the catalytic activity of the zinc ketoiminate complex used according to the invention was higher and led to a more rapid NCO degradation than DBTL. Accordingly, the zinc ketoiminate complex according to the invention represents an excellent alternative to tin catalysts that are of toxicological concern.

The zinc ketoiminate complexes according to the invention in particular enable a particularly effective catalysis in the production of polyurethanes from the CASE field, i.e. coatings, adhesives, sealants and elastomers, i.e. concerning PU coatings, PU adhesives, PU sealants and PU elastomers.

It is particularly preferred in the context of the present invention and corresponds to a preferred embodiment of the invention if the ketimine (B) of the formula (I) is one of the following compounds:

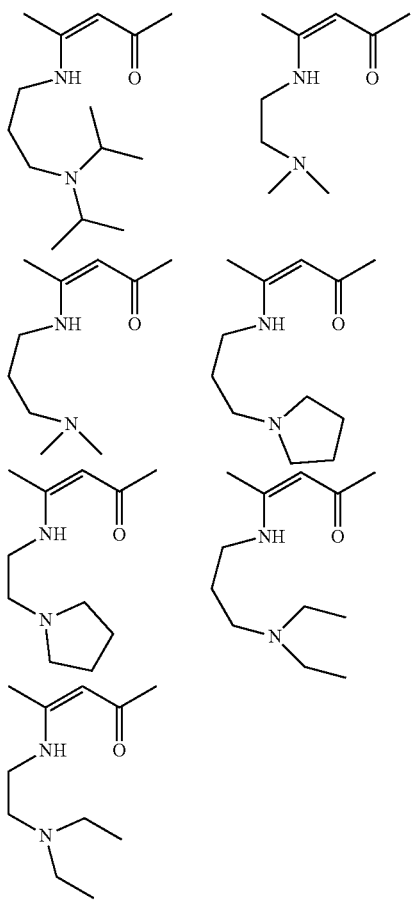

These ketimines enable a particularly effective performance with respect to the reaction of isocyanates with alcohol (the so-called gelling reaction). The solubility and compatibility of corresponding zinc ß-ketoiminates in the formulation can be adjusted by means of the structure of the counterion. Whereas, for example, a zinc ß-ketoiminate complex with phenolate ion as counterion is poorly soluble in some commonly used solvents, the use of diethylene glycol ethyl ether as alcohol for example, results in a liquid zinc complex. In this way it is possible to adjust the solubility, optionally the viscosity and the compatibility of the zinc ß-ketoiminates according to the invention.

The zinc compound is not subject to any particular limitation. It is preferred in the context of the present invention however and corresponds to a preferred embodiment of the invention if the zinc compound (A) used in accordance with the invention is an organozinc compound such as especially diethylzinc, or a zinc salt, such as preferably zinc chloride, zinc fluoride, zinc bromide and/or zinc iodide, especially zinc chloride or zinc iodide or is a zinc alkoxide.

If in the context of this invention for producing zinc ß-ketoiminate complexes an organozinc compound, such as diethylzinc in particular, is used, it is particularly advantageous if the organozinc compound is firstly reacted with ketimines (B) of the formula (I), preferably in the molar ratio 1 to 1, and subsequently an alcohol or polyether is added.

Since handling diethylzinc in the case of synthesis on a large scale can certainly present difficulties owing to self-ignition in air and further critical properties, the synthesis can also be carried out by reacting a zinc salt, preferably zinc iodide, with alkoxide or polyether ion previously deprotonated by exposure to a suitable basic substance such as potassium tert-butoxide for example. A zinc dialkoxide is formed in this way which reacts to give the zinc ß-ketoiminate according to the invention by reaction with one equivalent of ß-ketoimine ligand, likewise in deprotonated form. In the case of a high-boiling alcohol or polyether, this cannot be removed from the product by vacuum distillation and therefore remains as an impurity in the product. In addition, zinc ß-ketoiminates can be obtained by reaction of zinc salt, especially zinc chloride, with previously deprotonated ß-ketoiminate ligands and alkoxide, which are initially charged together and have been converted into the anionic form by exposure to a suitable base (e.g. potassium tert-butoxide).

In the context of this invention, preferably an organozinc compound is used, such as especially diethylzinc, for the synthesis of homoleptic zinc ß-ketoiminate complexes.

It corresponds to a further preferred embodiment of the invention if the zinc ketoiminate complexes according to the invention are used as catalyst in the production of polyurethanes.

In principle, the zinc ketoiminate complexes according to the invention are especially suitable for producing any polyurethanes, but particularly for producing PU coatings, PU adhesives, PU sealants or PU elastomers.

The production of polyurethanes is known per se and is commonly carried out by reacting at least one polyisocyanate with at least one compound having at least two hydrogen atoms that are reactive to isocyanate groups. The zinc ß-ketoiminate complexes according to the invention can be used as catalysts in this case, also for example with further catalysts such as amines. The term polyurethane within the context of the invention is to be understood advantageously as a generic term for a polymer produced from aromatic and aliphatic di- or polyisocyanates and polyols or other isocyanate-reactive species, such as amines for example, in that the urethane bond need not be the only or predominant type of bond. Polyisocyanurates and polyureas are also expressly included.

In addition to the zinc ketoiminate complex, further customary substances for producing polyurethanes can be used.

The catalysts according to the invention can be used as catalysts in the standard formulations for producing polyurethane systems, preferably consisting of one or more organic isocyanates having two or more isocyanate functions, one or more polyols having two or more isocyanate-reactive groups, optionally further catalysts for the isocyanate-polyol and/or isocyanate-water reactions and/or the trimerization of isocyanate, optionally flame retardants and optionally further additives.

Polyols suitable for the purposes of the present invention are preferably all organic substances having a plurality of isocyanate-reactive groups, and also preparations thereof. Preferred polyols are any polyether polyols and polyester polyols customarily used for producing polyurethane systems. Polyether polyols are obtained by reacting polyhydric alcohols or amines with alkylene oxides. Polyester polyols are based on esters of polybasic carboxylic acids (which may be either aliphatic, as in the case of adipic acid for example, or aromatic, as in the case of phthalic acid or terephthalic acid for example) with polyhydric alcohols (usually glycols). Natural oil-based polyols (NOPs) can also be used. These polyols are obtained from natural oils such as soya or palm oil for example and can be used in the modified or unmodified state.

A suitable ratio of isocyanate to polyol, expressed as the index of the formulation, is in the range from 10 to 1000, preferably from 40 to 350. This index describes the ratio of isocyanate actually used to calculated isocyanate (for a stoichiometric reaction with polyol). An index of 100 represents a molar reactive group ratio of 1:1.

Suitable further catalysts for the purposes of the present invention are substances catalysing the gel reaction (isocyanate-polyol), the blowing reaction (isocyanate-water) or the di- or trimerization of the isocyanate. Typical examples are amines, e.g. triethylamine, dimethylcyclohexylamine, tetramethylethylenediamine, tetramethylhexanediamine, pentainethyldiethylenetriamine, pentamethyldipropylenetriamine, triethylenediamine, dimethylpiperazine, 1,2-dimethylimidazole, N-ethylmorpholine, tris(dimethylaminopropyl)hexahydro-1,3,5-triazine, dimethylarninoethanol, dimethylaminoethoxyethanol and bis(dimethylaminoethyl) ether, and potassium salts such as potassium acetate. In particular, only those further catalysts are used which comprise no tin compounds, especially no dibutyltin dilaurate.

The amounts in which the catalyst is suitably used typically range from 0.01 to 5 pphp (=parts by weight based on 100 parts by weight of polyol).

Suitable flame retardants for the purposes of the present invention are preferably liquid organophosphorus compounds such as halogen-free organophosphates, e.g. triethyl phosphate (TEP), halogenated phosphates, e,g. tris(1-chloro-2-propyl) phosphate (TCPP) and tris(2-chloroethyl) phosphate (TCEP), and organic phosphonates, e.g. dimethyl methanephosphonate (DNIMP), dimethyl propanephosphonate (DMPP), or solids such as ammonium polyphosphate (APP) and red phosphorus. Suitable flame retardants further include halogenated compounds, for example halogenated polyols, and also solids such as expandable graphite and melamine.

The formulations can be processed to give coatings, adhesives, sealants, elastomers by all processes familiar to those skilled in the art. Polyurethane coatings, polyurethane adhesives, polyurethane sealants or polyurethane elastomers are known per se. PUR coatings are used to achieve scratch-resistant surface areas for example. Surfaces can be rendered resistant to chemical and mechanical stresses, for example, by a coating of polyurethane. Further possible uses are linings for doors, tables, floor tiles and wall elements in order to protect these from moisture, temperature and chemicals, but also to configure these products with respect to color, haptics and texture. The operation with the aid of a bar coater, spraying using spray systems, injection into a sealed mould for high-pressure casting or casting using a low-pressure system in an open form are possible processes for coating with PUR. PUR is used as adhesive for numerous purposes, to produce sheets for example wherein wood chips are bonded. Vehicle windshields can also be bonded using polyurethane or even wing halves of wind turbines can be rigidly bonded to each other. Polyurethane is suitable as sealant, for example in the repair of cracks in buildings. Joins, gaps, holes or cracks, inter alia, can be sealed. In addition, sealing beads can be applied directly to components, for example inner door cladding of motor vehicles etc. Polyurethane can also be processed in the form of an elastomer. Applications for processing as elastomer are, for example, concertina walls for buses, particularly resistant rollers and wheels or coatings for fabric, conveyor belts, bumper elements etc.

In particular, it is advantageous in the context of the present invention in the production of the polyurethane, to prepare a composition which comprises at least one zinc ketoiminate complex, obtainable as specified above, at least one polyol component and at least one isocyanate component, and this composition is reacted. This corresponds to a preferred embodiment of the invention.

According to a further preferred embodiment of the invention, the use according to the invention is characterized in that the zinc ketoiminate complexes according to the invention conform to the formula $Zn_k(L)_m(Y)_n$, where k is an integer from 1 to 20, m is 1, 2, 3 or 4, n is 0, 1, 2, 3 or 4, Y is a negatively charged ligand, in particular Y is an alkoxide ion, a polyoxyalkylene radical or the radical of a polyoxyalkylated compound, and L is a ligand of the formula (II),

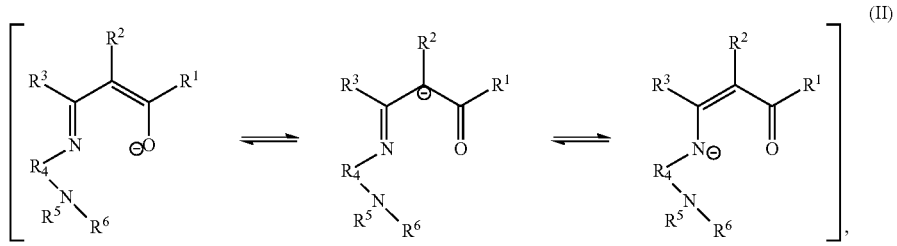

where $R^1$ to $R^6$ are as defined above.

The ligand of the formula (II) according to the invention formally comprises a delocalized single negative charge and can be depicted in different limiting structures. All possible limiting structures of the ligand L (II) are considered as equivalent in the context of the present invention.

In the zinc complex compound of the formula $Zn_k(L)_m(Y)_n$ according to the invention, Y is especially an alkoxide ion or a polyoxyalkylene radical or the radical of a polyoxyalkylated compound, which preferably has an (average) molecular weight Mn of about 70 to 2000 g/mol, particularly preferably 100 to 500 g/mol.

From a molecular weight of 100 g/mol, the solubility of the zinc complex improves or the complex is a liquid and can be even better incorporated in various formulations and systems.

Relatively high molecular weights, however, have the consequence that the zinc content of the zinc complex according to the invention, and thus the catalytic activity drop. The alkoxides that can be used are preferably deprotonated mono-, di- and trialkoxides having a molar mass of preferably 30 to 300 g/mol, particularly preferably 60 to 200 g/mol.

Accordingly, the alcohols which can be used are preferably methanol, ethanol, propan-1-ol, isopropanol, n-butanol, sec-butanol, tert-butanol, pentan-1-ol, hexan-1-ol, heptan-1-ol, octan-1-ol, nonan-1-ol, decan-1-ol, undecan-1-ol, dodecan-1-ol, tridecan-1-ol, pentadecan-1-ol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol monohexyl ether, diethylene glycol monobenzyl ether, triethylene glycol monomethyl ether, propylene glycol monomethyl ether, propylene glycol monoethyl ether, propylene glycol monobutyl ether, propylene glycol monopropyl ether, dipropylene glycol monomethyl ether, dipropylene glycol monoethyl ether, dipropylene glycol monopropyl ether, dipropylene glycol monoisopropyl ether, dipropylene glycol monobutyl ether, tripropylene glycol monomethyl ether and mixtures of these.

Among these, particular preference is given to ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monoethyl ether, propylene glycol monobutyl ether, dipropylene glycol monomethyl ether, dipropylene glycol monoethyl ether and dipropylene glycol monobutyl ether.

In addition, the alkoxides that can be used are phenolate and variously substituted phenol derivatives such as cardanol, eugenol, 4-tert-amylphenol, 2,4-tert-amylphenol.

The polyalkoxylenes that can be used in accordance with the invention are preferably those of formula (III)

$$A[-O-(CH2-CHR'-O-)m(CH2-CH2-O-)n-(CH2-CH(CH3)-O-)o-Z]a \qquad (III)$$

where

A is either hydrogen or an at least one carbon atom-comprising saturated or unsaturated organic radical, preferably an at least one carbon atom-comprising organic radical of an organic starter compound for preparing the compound, more preferably hydrogen or a methyl, ethyl, propyl, butyl, vinyl or allyl group, R' is independently at each occurrence a saturated alkyl group comprising 2-18 carbon atoms or an aromatic radical, preferably an ethyl group or a phenyl radical respectively, Z is either hydrogen, a linear or branched, saturated or unsaturated hydrocarbon radical comprising 1-18 carbon atoms, preferably hydrogen, or a methyl, ethyl, propyl, butyl, vinyl or allyl group, or the radical of an organic acid of formula —C(=O)—ZE, wherein ZE is an organic radical, preferably a linear or branched, saturated or olefinically unsaturated hydrocarbon radical comprising 1 to 17 carbon atoms, preferably a methyl group, or an aromatic hydrocarbon radical comprising 6 to 20 carbon atoms, preferably a phenyl radical, or the radical of formula —C(=O)—O—ZC, wherein ZC is an organic radical, preferably a linear or branched, saturated or olefinically unsaturated hydrocarbon radical comprising 1 to 18 carbon atoms, preferably a methyl group, ethyl group, or an aromatic hydrocarbon radical comprising 6 to 20 carbon atoms, preferably a phenyl radical, m=from 0 to 20, preferably from 0 to 10, particularly preferably from 0 to 5, n=from 0 to 50, preferably from 1 to 30, particularly preferably from 2 to 20, o=from 0 to 50, preferably from 3 to 30, particularly preferably from 5 to 20, a=from 1 to 8, preferably from greater than 1 to 6, particularly preferably 1, 2, 3 or 4, with the proviso that the sum of m, n and o is equal to or greater than 1, are used. It is preferable to use compounds of formula (III) comprising exclusively hydrogen atoms, oxygen atoms and carbon atoms.

The index values recited here and the value ranges of the indices specified may be understood to mean averages (weight averages) of the possible statistical distribution of the structures actually present and/or the mixtures thereof. This also applies to structural formulae reproduced per se exactly as such, for example to formula (III).

The units labelled m, n, and o may either be statistically mixed or else may form a blockwise arrangement in the chain. Statistical distributions may have a blockwise structure with any number of blocks and any sequence or be subject to a randomized distribution; they may also have an alternating structure or else form a gradient along the chain; in particular, they can also form any mixed forms thereof in which groups of different distributions may optionally follow one another. Specific embodiments may lead to restrictions to the statistical distributions as a result of the embodiment. There is no change in the statistical distribution for all regions unaffected by the restriction.

In the context of the present invention, radical A is preferably to be understood as meaning radicals of substances forming the start of the compound of formulae (III) to be produced, which is obtained by addition of alkylene oxides. The starter compound is preferably selected from the group of alcohols, polyetherols and phenols. It is preferable to use as starter compound containing the group A a mono- or polyhydric polyether alcohol and/or a mono- or polyhydric alcohol or any desired mixtures thereof. If a plurality of starter compounds A have been used as a mixture, the index a may also be subject to a statistical distribution. Z may in addition also be the radical of a starter compound Z—OH.

Monomers used with preference in the alkoxylation reaction are ethylene oxide, propylene oxide, butylene oxide and/or styrene oxide and also any desired mixtures of these epoxides. The different monomers may be used in pure form or as a mixture. A further epoxide can also be metered continuously over time into an epoxide already present in the reaction mixture, so as to give rise to an increasing concentration gradient of the epoxide added continuously. The polyoxyalkylenes formed are thus subject to a statistical distribution in the end product, restrictions being determinable via the metered addition. In this case of the continuous addition of a further epoxide to an epoxide already present in the reaction mixture, a structure gradient along the length of the chain is then to be expected. The correlations between metered addition and product structure are known to those skilled in the art.

Preference is given to using those compounds having a weight-average molar mass of 76 to 2000 g/mol, preferably of 100 to 1800 g/mol and particularly preferably of 100 to 600 g/mol.

Preference may be given to using those compounds derived from a compound of formula (IV)

$$A[-OH]_a \quad\quad\quad (IV)$$

wherein the radical A is derived from compounds selected from the group consisting of mono- and polyhydric monomeric, oligomeric and polymeric alcohols, phenols, carbohydrates and carbohydrate derivatives, wherein particular preference is given to using those compounds of formula (VI) where the radical A is derived from one or more alcohols from the group of butanol, 1-hexenol, octanol, dodecanol, stearyl alcohol, vinyloxybutanol, 2-ethylhexanol, cyclohexanol, benzyl alcohol, ethylene glycol, propylene glycol, di-, tri- and polyethylene glycol, 1,2-propylene glycol, di- and polypropylene glycol, 1,4-butanediol, 1,6-hexanediol, trimethylolpropane, glycerol, pentaerythritol, sorbitol, allyl alcohol, vinyl alcohol or from hydroxyl group-bearing compounds based on natural products.

Particular preference is given to using those compounds that are liquid at a pressure of 101 325 Pa and a temperature of 23° C. Among these, very particular preference is given to butyl diglycol, dipropylene glycol and propylene glycol.

Compounds that can be used in accordance with the invention as polyetherols and processes for the production thereof are described for example in EP 0075703, U.S. Pat. No. 3,775,452 and EP 1031603. Suitable processes utilize, for example, basic catalysts, for example alkali metal hydroxides and alkali metal methoxides. The use of KOH is particularly widespread and has been known for many years. Such processes typically comprise reacting a hydroxy-functional starter, generally of low molecular weight, i.e. having a molecular weight below 200 g/mol, such as butanol, allyl alcohol, propylene glycol or glycerol, with an alkylene oxide such as ethylene oxide, propylene oxide, butylene oxide or a mixture of different alkylene oxides in the presence of the alkaline catalyst to afford a polyoxyalkylene polyether. The strongly alkaline reaction conditions in this so-called living polymerization promote various side reactions. Irrespective of the production route, compounds preferably having a polydispersity Mw/Mn of 1.0 to 1.5, by preference having a polydispersity of 1.0 to 1.3, are preferentially suitable. The polydispersity (PD) may be determined by a method known per se to those skilled in the art by determining by gel permeation chromatography (GPC) both the number-average molecular weight (Mn) and the weight-average molecular weight (Mw). The polydispersity is defined by PD=Mw/Mn. Depending on the alkylene oxide terminus, the polyetherols for use according to the invention may have a primary or secondary OH function.

The present invention also provides a composition comprising at least one polyol component, wherein the composition comprises at least one zinc ketoiminate complex, as defined above.

In a preferred embodiment of the invention, this composition is characterized in that it comprises at least one isocyanate component.

If the polyurethane system is a PU coating, PU adhesive, PU sealant or PU elastomer, it is a preferred embodiment of the invention.

In particular, it is preferable that the polyurethane system according to the invention comprises a proportion by mass of zinc ketoiminate complex in the finished polyurethane system of 0.005 to 10% by weight.

EXAMPLES

Example A: Preparation of the Ligands, General Procedure

In a 50 mL Schlenk flask, 6.1 mL of acetylacetone were dissolved in dichloromethane and cooled in an ice bath. To this was added the corresponding amine in the ratio 1:1 (based on acetylacetone) and the solution was subsequently stirred at RT for two hours. The resulting water and the solvent were removed under reduced pressure.

Synthesis of ligand L¹H

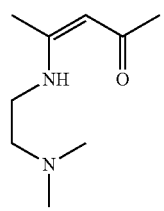

6.6 mL of dimethylethylenediamine were used. The product is a yellow oil. Yield: 9.4 g (92%).

Synthesis of ligand L²H

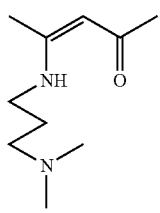

7.5 mL of dimethylpropylenediamine were used. The product is a yellow oil. Yield: 9.95 g (90%).

Synthesis of ligand L³H

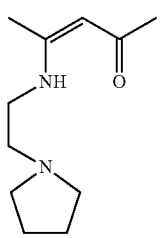

7.6 mL of 1-(2-aminoethyl)pyrrolidine were used. The product is a yellow oil. Yield: 11.01 g (93%).

Synthesis of ligand L⁴H

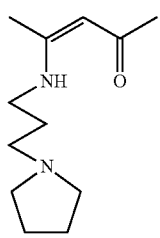

6.8 mL of 1-(3-aminopropyl)pyrrolidine were used. The product is a yellow oil. Yield: 12.15 g (96%).

Synthesis of ligand L⁵H

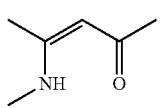

30 mL of a 2 molar methylamine solution were used. The product is a yellow crystalline solid. Yield: 5.61 g (82%).

Synthesis of ligand L⁶H

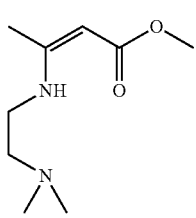

6.5 mL of methyl acetoacetate and 6.62 mL of dimethylethylenediamine were used. The product is a yellow oil. Yield: 10.84 g (97%).

Example B: Preparation of the Zinc Complex $L^xZnOR$, General Procedure

Synthesis of the zinc complex $L^xZnEt$

In a baked-out 50 mL Schlenk flask, 10 mL of a 1 molar diethylzinc solution in hexane (10 mmol) were initially charged. In a further flask, 10 mmol of the corresponding ligand were dissolved in ca. 20 mL of hexane. Both solutions were cooled to ca. −35° C. and the ligand solution was added slowly with continuous stirring to the diethylzinc solution. The reaction mixture was then warmed to RT over ca. 5 hours. The precipitated product was filtered off and dried under vacuum. Synthesis of the zinc complex $L^1ZnEt$:

1.7 g of the ligand $L^1H$ were used. The product is a yellow powder. Yield: 2.51 g (94%).

Synthesis of the zinc complex $L^2ZnEt$:

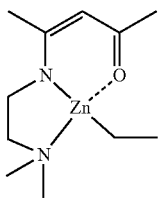

1.84 g of the ligand $L^2H$ were used. The product is a yellow powder. Yield: 2.28 g (82%).

Synthesis of the zinc complex $L^3ZnEt$:

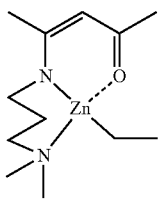

1.96 g of the ligand $L^3H$ were used. The product is a yellow crystalline solid. Yield: 2.43 g (84%).

Synthesis of the zinc complex $L^4ZnEt$:

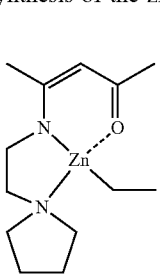

2.1 g of the ligand $L^4H$ were used. The product is a yellow crystalline solid. Yield: 2.43 g (80%).

Synthesis of the zinc complex L⁵ZnEt:

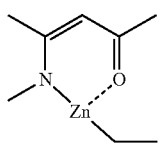

1.13 g of the ligand L⁵H were used. The product is a yellow solid. Yield: 1.8 g (87%).

Synthesis of the zinc complex L⁶ZnEt:

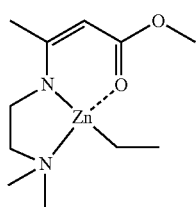

1.86 g of the ligand L⁶H were used. The product is a pale yellow crystalline solid. Yield: 3.7 g (93%).

Synthesis of the zinc complex L$^x$ZnOR 0.5 g (1.9 mmol) of L$^x$ZnEt was weighed into a 50 ml Schlenk flask and dissolved in 15 ml of toluene. 0.26 mL (1.9 mmol) of the corresponding alcohol was added to a further flask and likewise dissolved in about 15 mL of toluene. Both solutions were cooled to ca. −20° C. and the alcohol solution was then added with continuous stirring to the L¹ZnEt solution. The reaction mixture was then warmed to RT over ca. 8 hours. The solvent was then removed under reduced pressure.

Synthesis of the zinc complex 1B (L¹ZnDEGEE):

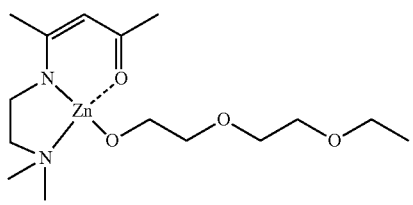

0.5 g of the complex L¹ZnEt and 0.26 mL of diethylene glycol monoethyl ether (DEGEE) were used. The product is a yellow oil. Yield: 0.68 g (97%).

Synthesis of the zinc complex 2B (L¹ZnOPh):

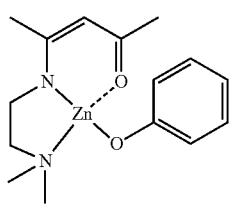

0.5 g of the complex L¹ZnEt and 0.18 g of phenol were used. The product is a pale yellow powder. Yield: 0.5 g (81%).

Synthesis of the zinc complex 3B (L¹ZnCard):

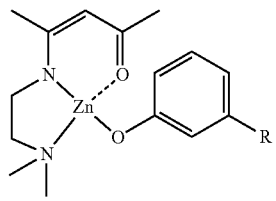

0.5 g of the complex L¹ZnEt and 0.57 g (1.9 mmol) of cardanol were used. The product is a red highly viscous liquid. Yield: 0.59 g (90%).

Synthesis of the zinc complex 4B (L¹ZnPolyether):

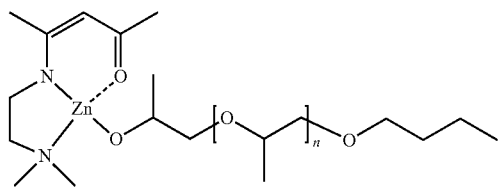

0.5 g of the complex L¹ZnEt and 0.75 g of poly(oxypropylene) monobutyl ether having molar mass $M_{OH}$=394 g/mol, which was determined via the OH number, were used. The product is a yellow highly viscous liquid. Yield: 1.15 g (96%).

Synthesis of the zinc complex 5B (L²ZnDEGEE):

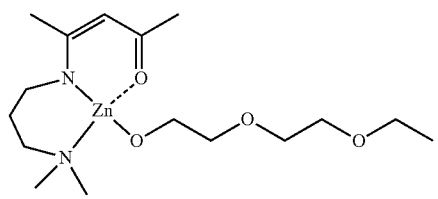

0.53 g of the complex L²ZnEt and 0.26 mL of diethylene glycol monoethyl ether (DEGEE) were used. The product is a yellow viscous liquid. Yield: 0.69 g (96%).

Synthesis of the zinc complex 6B (L²ZnOPh):

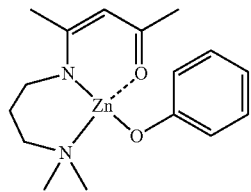

0.53 g of the complex L²ZnEt and 0.18 g of phenol were used. The product is a pale white powder. Yield: 0.56 g (86%).

Synthesis of the zinc complex 7B (L²ZnPolyether):

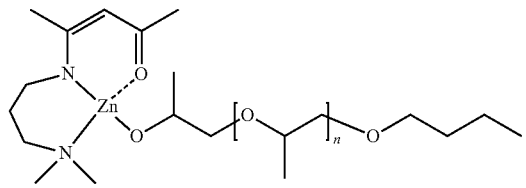

0.53 g of the complex L²ZnEt and 0.75 g of poly(oxypropylene) monobutyl ether having molar mass $M_{OH}$=394 g/mol, which was determined via the OH number, were used. The product is a yellow highly viscous liquid. Yield: 1.17 g (95%).

Synthesis of the zinc complex 8B (L³ZnPolyether):

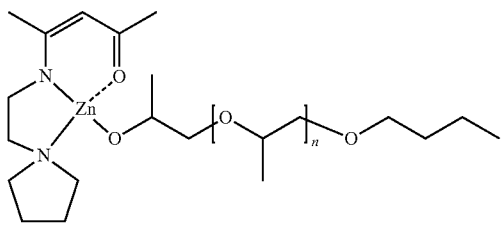

0.55 g of the complex L³ZnEt and 0.75 g of poly(oxypropylene) monobutyl ether having molar mass $M_{OH}$=394 g/mol, which was determined via the OH number, were used. The product is a yellow highly viscous liquid. Yield: 1.15 g (92%).

Synthesis of the zinc complex 9B (L⁴ZnPolyether):

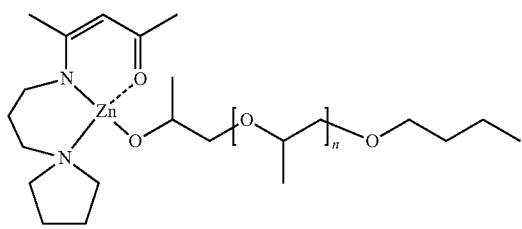

0.58 g of the complex L⁴ZnEt and 0.75 g of poly(oxypropylene) monobutyl ether having molar mass $M_{OH}$=394 g/mol, which was determined via the OH number, were used. The product is a yellow highly viscous liquid. Yield: 1.18 g (91%).

Synthesis of the zinc complex 10B (L⁵ZnOPh):

0.39 g of the complex L⁵ZnEt and 0.18 g of phenol were used. The product is a white powder.

Yield: 0.49 g (95%).

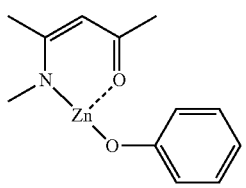

Synthesis of the zinc complex 11B (L⁶ZnOPh):

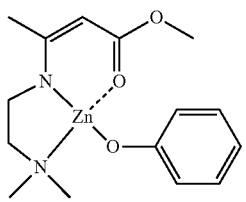

0.53 g of the complex L⁶ZnEt and 0.18 g of phenol were used. The product is a pale yellow powder. Yield: 0.63 g (97%).

Example C: Preparation of the Zinc Complex L$^x$ZnOR, General Procedure

Synthesis of the zinc complex L$^x$ZnEt

In a baked-out 250 mL Schlenk flask, 60 mL (0.06 mol) of a 1 molar diethylzinc solution in hexane (60 mmol) were initially charged and the solution was cooled to ca. −35° C. In a further flask, 60 mmol of the corresponding ligand were dissolved in hexane and the solution was added with continuous stirring over 15 minutes to the diethylzinc solution. The reaction mixture was then warmed to RT over ca. one hour and the mixture was stirred at RT for a further hour. The solvent was then drawn off under reduced pressure and the resulting intermediate was taken up in toluene. 0.06 mol of the corresponding alcohol/polyether was added dropwise to the resulting solution at RT, and the reaction mixture was cooled in a water bath. After stirring for 1.5 hours, toluene was removed under reduced pressure at 30° C.

Synthesis of the zinc complex 1C (L¹ZnDEGEE):

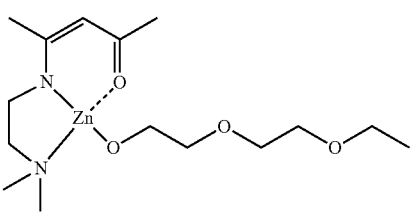

10.2 g of the ligand L¹H and 8.05 g of diethylene glycol monoethyl ether were used. 22 g of a clear brown liquid were obtained.

Synthesis of the zinc complex 2C (L¹ZnBDG):

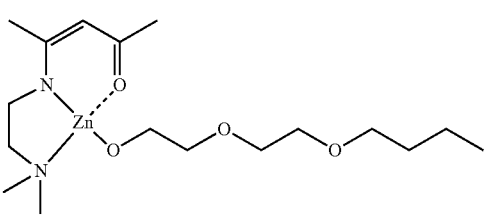

10.2 g of the ligand L¹H and 9.7 g of butyl diglycol were used. 24.1 g of a clear brown liquid were obtained.

Synthesis of the zinc complex 3C (L¹ZnPolyether):

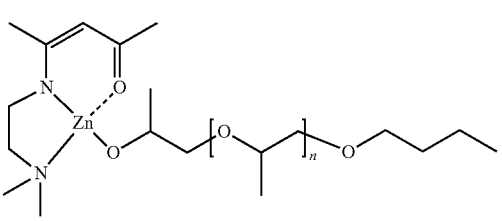

10.2 g of the ligand L¹H and 24 g of poly(oxypropylene) monobutyl ether were used. 37.9 g of an orange-colored liquid were obtained.

Synthesis of the zinc complex 4C (L²ZnPolyether):

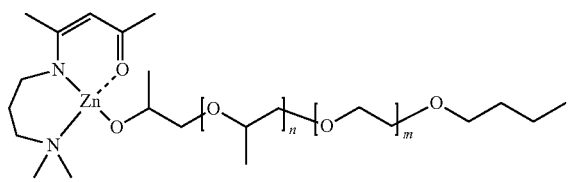

11.05 g of the ligand L²H and 30 g of poly(oxypropylene) copoly(oxyethylene) monobutyl ether (comprises 40% by weight PO and 60% by weight EO) having molar mass $M_{OH}$=500 g/mol, which was determined via the OH number, were used. 44.9 g of an orange-brown liquid were obtained.

Synthesis of the zinc complex 5C (L²ZnDEGEE):

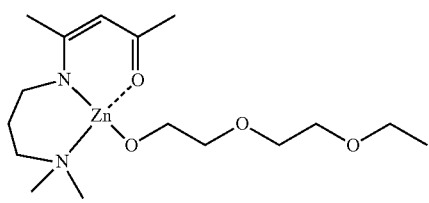

11.05 g of the ligand L²H and 8.05 g of diethylene glycol monoethyl ether were used. 22.7 g of a clear brown liquid were obtained.

Synthesis of the zinc complex 6C (L²ZnBDG):

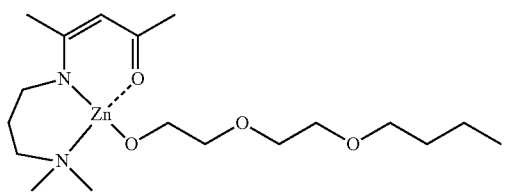

11.05 g of the ligand L²H and 9.7 g of butyl diglycol were used. 23.3 g of a clear brown liquid were obtained.

Synthesis of the zinc complex 7C (L²ZnPolyether):

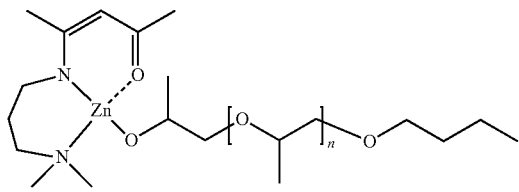

10.8 g of the ligand L²H and 24 g of poly(oxypropylene) monobutyl ether having molar mass $M_{OH}$=394 g/mol, which was determined via the OH number, were used. 36.3 g of an orange-colored liquid were obtained.

Example D: Alkylzinc-Free Synthesis of the Zinc Complex L$^x$ZnOR, General Procedure In a multi-necked flask equipped with a precision glass paddle stirrer, inert gas inlet and temperature sensor, 0.09 mol of polyether was initially charged and 0.09 mol of potassium tert-butoxide, dissolved in ca. 100 mL of THF, was added and the mixture was stirred at RT for one hour. In another flask, a zinc iodide solution was prepared from 0.045 mol of zinc iodide and 60 mL of THF and was added slowly to the polyether solution, whereupon a white precipitate formed. To complete the precipitation, the solution was stirred at RT for a further hour and then filtered. After the filtration, 0.045 mol of ligand L$^x$H was added. After renewed stirring at RT (one hour), the solution was optionally filtered and freed from the volatile components at 50° C. and 1 mbar on a rotary evaporator.

Synthesis of the zinc complex 1D (L¹ZnPolyether):

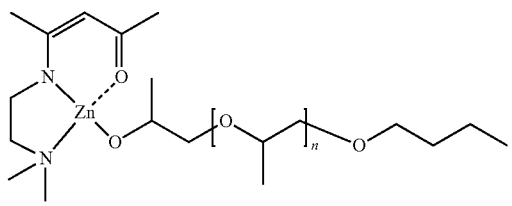

8.1 g of the ligand L¹H and 35.4 g of poly(oxypropylene) monobutyl ether having molar mass $M_{OH}$=394 g/mol, which was determined via the OH number, were used. 44.1 g of a brown liquid were obtained.

Synthesis of the zinc complex 2D (L²ZnPolyether):

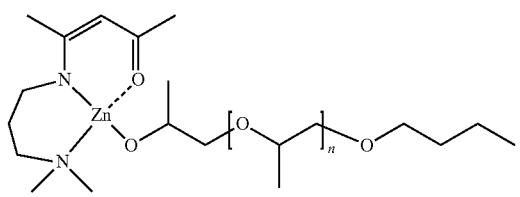

8.3 g of the ligand L²H and 35.4 g of poly(oxypropylene) monobutyl ether having molar mass $M_{OH}$=394 g/mol, which was determined via the OH number, were used. 42.1 g of a brown liquid were obtained.

Example E: Alkylzinc-Free Synthesis of the Zinc Complex L$^x$ZnOR, General Procedure In a multi-necked flask equipped with a precision glass paddle stirrer, inert gas inlet and temperature sensor, 0.05 mol of polyether and 0.05 mol of ligand L$^x$H were added to a potassium tert-butoxide solution comprising 0.099 mol of potassium tert-butoxide and 75 mL of isopropanol (p.A.) and the mixture was stirred at 50° C. In another flask, a zinc chloride solution was prepared from 0.05 mol of zinc chloride and 30 mL of isopropanol (p.A.) and was added slowly to the polyether/ligand solution, whereupon a white precipitate formed. To complete the precipitation, the solution was stirred at RT for one hour then filtered and freed from the volatile components at 50° C. and 1 mbar on a rotary evaporator.

Synthesis of the zinc complex 1E (L¹ZnPolyether):

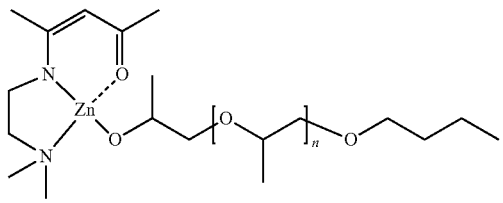

8.5 g of the ligand L¹H and 19.7 g of poly(oxypropylene) monobutyl ether having molar mass $M_{OH}$=394 g/mol, which was determined via the OH number, were used. 28.7 g of a brown liquid were obtained.

Investigation of the Catalytic Activity

The catalytic activity of the zinc ß-ketoiminate complexes were investigated with in situ IR spectroscopy. Here, in an automated synthesizer, 30 mmol of phenyl isocyanate dissolved in toluene were reacted at 25° C. with 30 mmol of isopropanol also dissolved in toluene by addition of a solution of a catalyst in toluene (1 mol % based on isocyanate). The reaction conversion was monitored by the decrease of the NCO absorption band at 2264 $cm^{-1}$ for 30 minutes. In the experimental series, all parameters were constant, such as solution concentrations, solution volumes and stirring speed. The temperature was controlled by the automatic synthesizer. The results of the IR measurements are compiled in the following table.

|  | Time to % conversion (min) | | |
| --- | --- | --- | --- |
| Zinc complex | 25% | 50% | 75% |
| L1ZnDEGEE (1C) | 1.93 | 4.18 | 8.68 |
| L1ZnPolyether (3B) | 1.68 | 3.93 | 7.93 |
| DBTL | 1.98 | 4.18 | 8.93 |
| L1ZnOPh (2B) | 1.43 | 3.93 | 8.18 |

As the results of the IR measurements show, phenyl isocyanate reacts with isopropanol in the presence of the catalyst 1C, 2B and 3B more rapidly than in the presence of DBTL.

The invention claimed is:

1. A process of making a zinc ketoiminate complex comprising the steps of reacting a zinc compound (A) with ketimines (B) of the formula (I) and alcohol or polyether

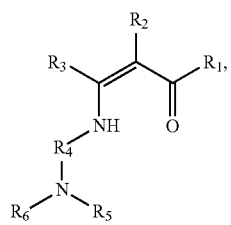

where $R_1$ and $R_3$ are organic radicals having from 1 to 6 carbon atoms, comprising heteroatoms selected from the group consisting of oxygen, nitrogen and halogen atoms, $R_2$ is H–, $R_4$ is an organic radical having 1 to 4 carbon atoms comprising heteroatoms selected from the group consisting of oxygen, nitrogen and halogen atoms, $R_5$ and $R_6$ are organic radicals having 1 to 6 carbon atoms, comprising heteroatoms selected from the group consisting of oxygen, nitrogen and halogen atoms, wherein the radicals $R_5$ and $R_6$ may also be bonded to form a ring.

2. A process of making a zinc ketoiminate complex-comprising the steps of reacting a zinc compound (A) with ketimines (B) of the formula (I) and alcohol or polyether with ketimines (B) is one of the following compounds

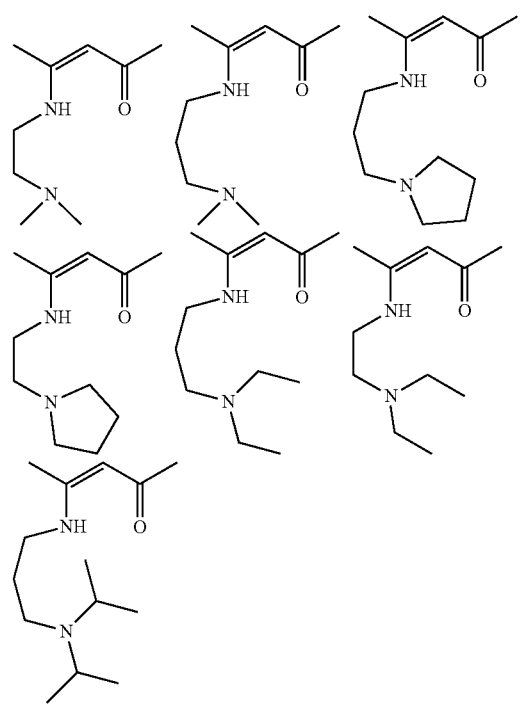

wherein the zinc ketoiminate complex are obtained by reacting a zinc compound (A) with alkoxide or polyether ion previously deprotonated by exposure to suitable basic substances, such that a zinc dialkoxide is formed, which is reacted with previously deprotonated ketimines (B).

3. The process according to claim 1, wherein the zinc compound (A) is an organozinc compound.

4. The process according to claim 3, wherein an organozinc compound is used, and the alcohol is added after (A) has been reacted with (B).

5. The process according to claim 3, wherein the zinc ketoiminate complex are obtained by reaction of zinc salt with previously deprotonated ketimines (B) and alkoxide, which have been converted into the anionic form by exposure to a suitable base.

6. The process according to claim 3, wherein the zinc ketoiminate complex are obtained by reacting a zinc salt with alkoxide or polyether ion previously deprotonated by exposure to suitable basic substances, such that a zinc dialkoxide is formed, which is reacted with previously deprotonated ketimines (B).

7. The process according to claim 1, wherein the zinc ketoiminate complex is used as catalyst in the production of a polyurethane.

8. The process according to claim 1, wherein a PU coating, PU adhesive, PU sealant or PU elastomer is produced.

9. The process according to claim 7, wherein in the production of the polyurethane, a composition is prepared which comprises at least one zinc ketoiminate complex, at least one polyol component and at least one isocyanate component, and this composition is reacted.

10. The process according to claim 1, wherein the zinc ketoiminate complex is formula $Zn_k(L)_m(Y)_n$, where k is an integer from 1 to 20, m is 1, 2, 3 or 4, n is 0, 1, 2, 3 or 4, Y is a negatively charged ligand selected from the group consisting of an alkoxide ion, phenolate ion, a polyoxyalkylene radical or the radical of a polyoxyalkylated compound, and L is a ligand of formula (II),

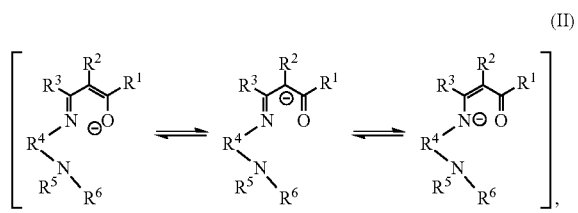

(II)

where $R^1$ to $R^6$ are $R_1$ to $R_6$.

11. A composition comprising at least one polyol component, wherein the composition comprises at least one zinc ketoiminate complex as defined in claim 1.

12. The composition according to claim 11, wherein the composition comprises at least one isocyanate component.

13. A polyurethane made with the zinc ketoiminate complex according to claim 1.

14. The polyurethane according to claim 13, wherein the polyurethane system is a PU coating, PU adhesive, PU sealant or PU elastomer.

15. The polyurethane according to claim 14, wherein the polyurethane comprises a proportion by mass of zinc ketoiminate complex in the polyurethane system of 0.005 to 10% by weight.

16. A process of making a zinc ketoiminate complex-comprising the steps of reacting a zinc compound (A) with ketimines (B) of the formula (I) and alcohol or polyether with ketimines (B) is one of the following compounds

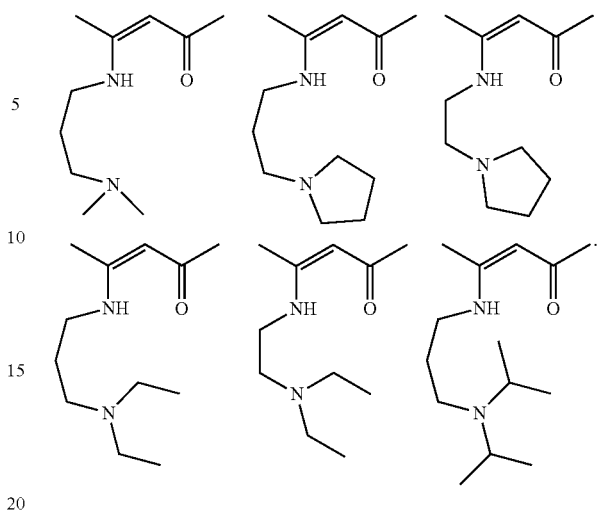

17. The process according to claim 3, wherein an organozinc compound is diethylzinc, and the alcohol is selected from the group consisting of phenol, cardanol, diethylene glycol monoethyl ether or poly(oxypropylene) monobutyl ether.

18. The process according to claim 3, wherein the zinc compound (A) is zinc chloride.

19. The process according to claim 3, wherein the zinc ketoiminate complex are obtained by reacting a zinc iodide, with alkoxide or polyether ion previously deprotonated by exposure to suitable basic substances, such that a zinc dialkoxide is formed, which is reacted with previously deprotonated ketimines (B).

20. A polyurethane obtained by the process according to claim 2.

* * * * *